United States Patent
Neighbors

(10) Patent No.: US 10,034,453 B2
(45) Date of Patent: Jul. 31, 2018

(54) INTELLIGENT PET FOOD DISPENSER

(71) Applicant: Connor Neighbors, Richardson, TX (US)

(72) Inventor: Connor Neighbors, Richardson, TX (US)

( * ) Notice: Subject to any disclaimer, the term of this patent is extended or adjusted under 35 U.S.C. 154(b) by 261 days.

(21) Appl. No.: 14/878,128

(22) Filed: Oct. 8, 2015

(65) Prior Publication Data
US 2017/0099803 A1   Apr. 13, 2017

(51) Int. Cl.
*A01K 5/02* (2006.01)
*A01K 29/00* (2006.01)
*G08B 21/18* (2006.01)

(52) U.S. Cl.
CPC .......... *A01K 5/0208* (2013.01); *A01K 29/005* (2013.01); *G08B 21/182* (2013.01)

(58) Field of Classification Search
CPC .. A01K 5/0208; A01K 5/0291; A01K 5/0275; A01K 29/005; G08B 21/182
USPC ...................................................... 119/51.02
See application file for complete search history.

(56) References Cited

U.S. PATENT DOCUMENTS

| | | | | |
|---|---|---|---|---|
| 4,820,527 A * | 4/1989 | Christensen | ........... | A01K 9/005 426/2 |
| 5,239,943 A * | 8/1993 | Kim | ..................... | A01K 5/0291 119/51.12 |
| 6,145,472 A * | 11/2000 | Vittuari | ................. | A01K 5/0291 119/51.02 |
| 8,701,595 B2 * | 4/2014 | Jin | ........................ | A01K 5/0291 119/51.01 |
| 9,232,769 B1 * | 1/2016 | Wolf | ........................ | A01K 5/02 |
| 9,433,189 B2 * | 9/2016 | Taneja | ................. | A01K 5/0291 |
| 2007/0181068 A1 * | 8/2007 | McKeown | ............... | A01K 5/02 119/51.02 |
| 2012/0199076 A1 * | 8/2012 | Biede | .................... | A01K 5/0114 119/51.02 |
| 2015/0053138 A1 * | 2/2015 | Ramsey | ............ | H04M 1/72533 119/61.5 |
| 2016/0023793 A1 * | 1/2016 | Wilson | .................... | B65B 69/00 53/381.4 |
| 2016/0029592 A1 * | 2/2016 | Springer | ............... | A01K 5/0225 119/51.11 |
| 2017/0202178 A1 * | 7/2017 | Gordon | ................. | A01K 5/0275 |

FOREIGN PATENT DOCUMENTS

FR     2701353 A1 *  8/1994  .......... A01K 5/0291

* cited by examiner

*Primary Examiner* — Joshua D Huson
(74) *Attorney, Agent, or Firm* — Baker Botts L.L.P.

(57) ABSTRACT

In one embodiment, a system for dispensing pet food includes a chamber, a transport conveyor, a blade, and an extractor. The chamber may dispense a pet found pouch to the transport conveyer. The transport conveyor may receive the pet food pouch and transport the pet food pouch to the blade wherein the blade may cut open the pet food pouch. The transport conveyor may then move the opened pet food pouch to the extractor. The transport conveyor may activate the extractor causing the extractor to lower onto the transport conveyor and extract pet food from the pet food pouch into a food tray. The transport conveyor may dispose the pet food pouch into a trash tray by releasing a trapdoor.

14 Claims, 4 Drawing Sheets

INTELLIGENT PET FOOD DISPENSER

TECHNICAL FIELD

This disclosure relates generally to animal care and, more specifically, to an intelligent pet food dispenser.

BACKGROUND

Each day many pet owners forget to feed their pets or feed their pets at sporadic times that are convenient for the pet owner. While some pet owners forget to refill their pet's food bowl, other owners fail to monitor the amount of available pet food until the food runs out. Furthermore, many pet owners fail to maintain a healthy diet for their pet by providing incorrect portions or unhealthy food. When pet owners due remember to feed their pets, the feeding conditions may be unsanitary.

SUMMARY OF THE DISCLOSURE

In accordance with the present disclosure, disadvantages and problems associated with an intelligent pet food dispenser may be reduced or eliminated.

In one embodiment, a system for dispensing pet food includes a chamber, a transport conveyor, a blade, and an extractor. The chamber may dispense a pet found pouch to the transport conveyer. The transport conveyor may receive the pet food pouch and transport the pet food pouch to the blade wherein the blade may cut open the pet food pouch. The transport conveyor may then move the opened pet food pouch to the extractor. The transport conveyor may activate the extractor causing the extractor to lower onto the transport conveyor and extract pet food from the pet food pouch into a food tray. The transport conveyor may dispose the pet food pouch into a trash tray by releasing a trapdoor.

In another embodiment, a method for dispensing pet food includes receiving, at a transport conveyor, a pet food pouch from a chamber. The method may further include moving the pet food pouch to a cutting position and opening the pet food pouch using a blade. The method may further include moving the opened pet food pouch to an extractor and removing pet food from the pet food pouch to a food tray. The method may further include disposing the pet food pouch through a trap door into a trash tray below the transport conveyor.

Certain embodiments of the present disclosure may provide one or more technical advantages. One advantage of the present disclosure ensures the timely and proper feeding of a pet, even if a pet owner is unavailable to provide the pet food. Another advantage creates sanitary feeding conditions by killing bacteria and storing waste associated with feeding a pet. Still another advantage of the present disclosure improves pet health by monitoring the pet food provided to a pet along with the frequency of the feeding times. One or more other technical advantages may be readily apparent to one skilled in the art from the figures, descriptions, and claims, included herein.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Figure 1:
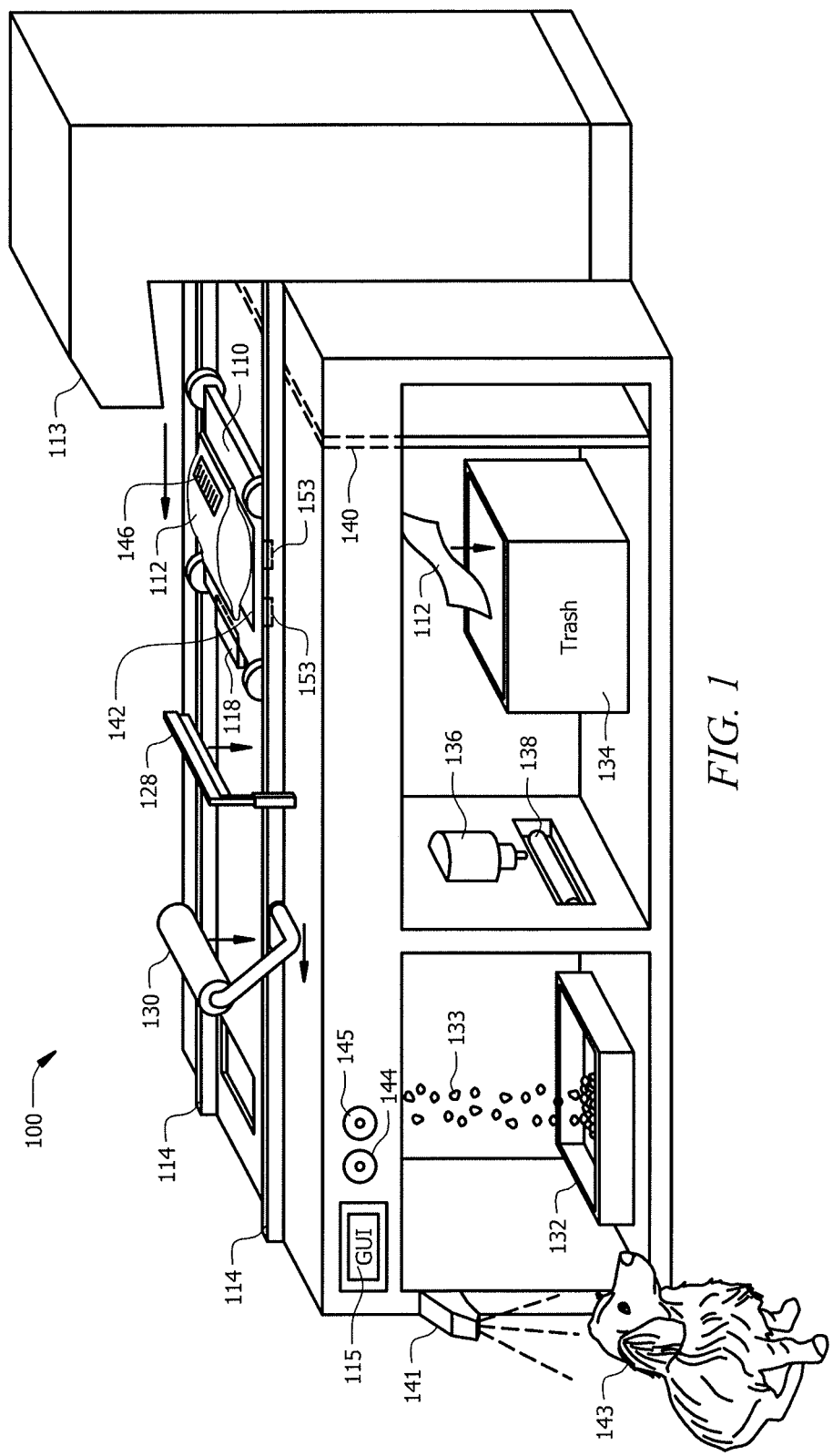
FIG. 1 illustrates an example pet food dispenser according to an embodiment of the present disclosure.
Figure 2A:
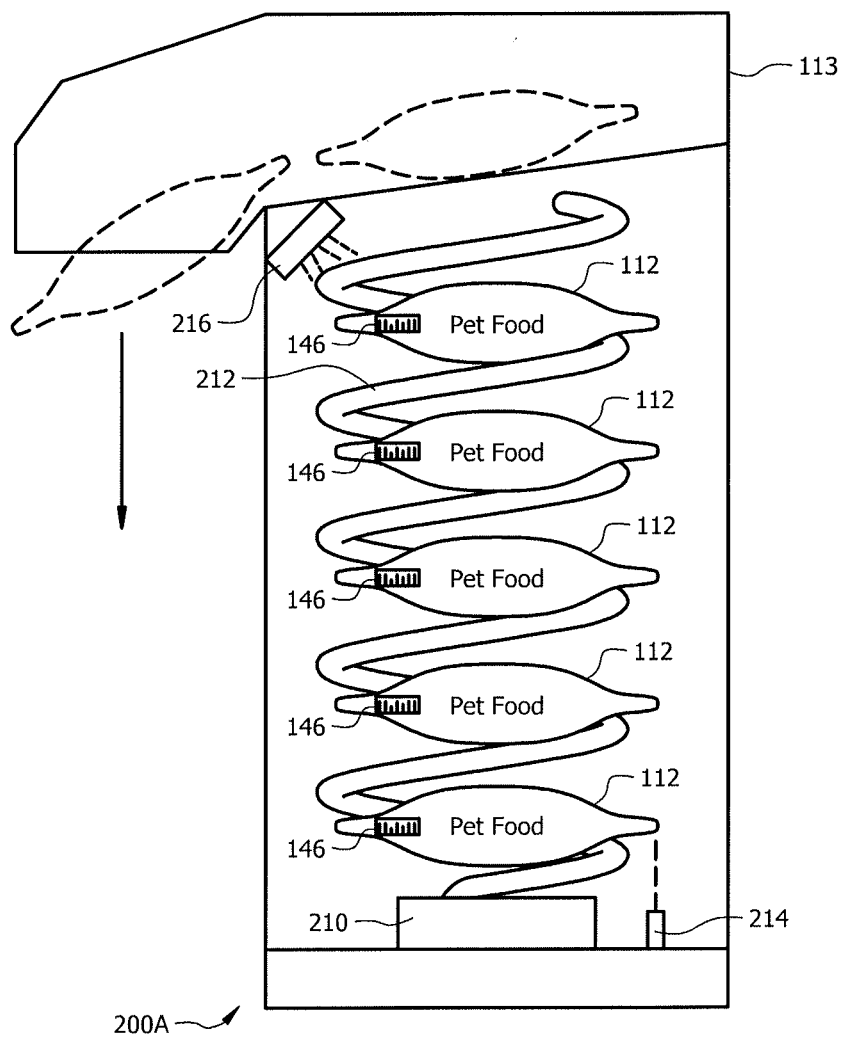
FIG. 2A is a diagram of an example spiral dispensing mechanism of a pet food chamber according to an embodiment of the present disclosure.
Figure 2B:
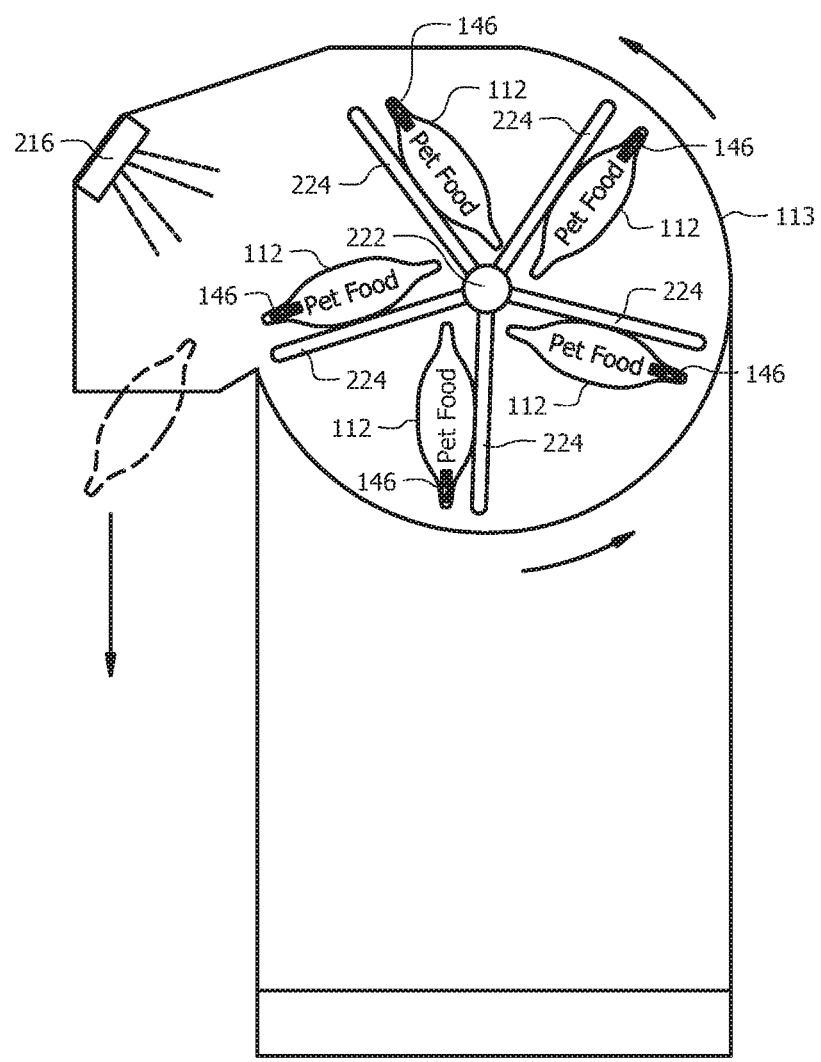
FIG. 2B is a diagram of an example carousel dispensing mechanism of a pet food chamber according to an embodiment of the present disclosure.
Figure 3:
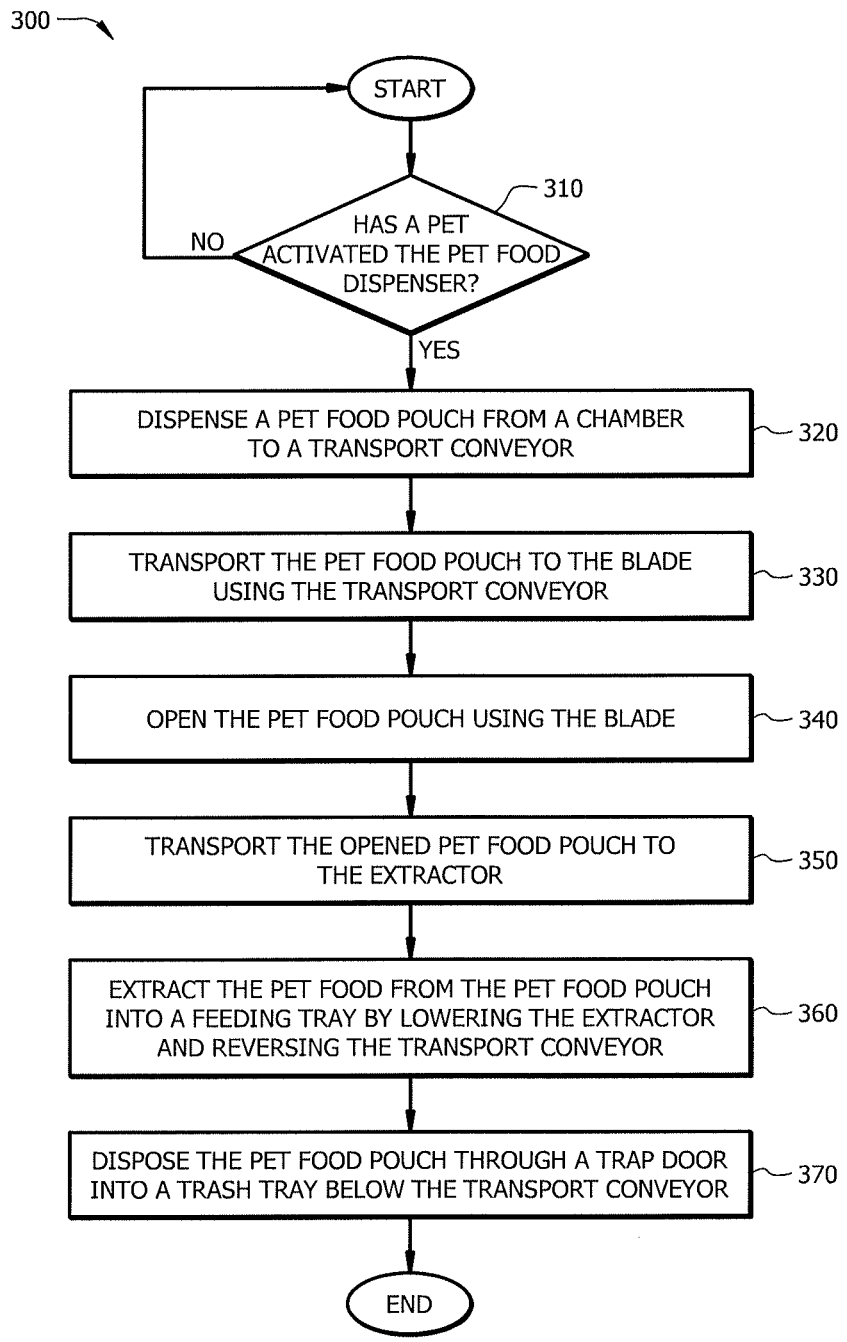
FIG. 3 is a flowchart of an example method for dispensing food using an intelligent pet food dispenser.

Embodiments of the present disclosure and its advantages are best understood by referring to FIGS. 1-3, like numerals being used for like and corresponding parts of the various drawings.

Each day many pet owners forget to feed their pets or feed their pets at sporadic times that are convenient for the pet owner. While some pet owners forget to refill their pet's food bowl, other owners fail to monitor the amount of available pet food until the food runs out. Furthermore, many pet owners fail to maintain a healthy diet for their pet by providing incorrect portions or unhealthy food. When pet owners due remember to feed their pets, the feeding conditions may be unsanitary.

It is therefore advantageous to provide a system and method for an intelligent pet food dispenser to ensure that pets are fed a healthy, on-time meal in sanitary conditions. For example, when a pet is hungry, the pet may approach the intelligent pet food dispenser to initiate the food dispensing operation. In some embodiments, a motion sensor may detect the presence of the pet standing in front of the pet food dispenser. In response to detecting the pet, a chamber storing pet food pouches may release a pet food pouch onto a transport conveyor. After receiving the pet food pouch, the transport conveyor may move down a track to a cutting device, which cuts open the pet food pouch. The transport conveyor may then proceed to the end of the track. Upon reaching the end of the track, the transport conveyor may begin moving in the reverse direction. When moving in the reverse direction, the transport conveyor may engage an extraction device, such as a roller, that extracts the pet food from the pouch, causing the pet food to fall into a food tray. The transport conveyor may then continue in the reverse direction until a trap door in the transport conveyor is activated causing the empty pet food pouch to fall into a trash tray. The transport conveyor may then reach its original position where it resets and waits for delivery of another pet food pouch.

Using an intelligent pet food dispenser to deliver pet food provides several technical advantages not realized by current systems. One advantage of the present disclosure ensures the timely and proper feeding of a pet even if a pet owner is unavailable to provide the pet food. Another advantage creates sanitary feeding conditions for a pet by killing bacteria and storing waste associated with feeding a pet. Still another advantage of the present disclosure improves pet health by monitoring the nutritional value of the pet food provided to a pet along with the number and frequency of the feeding times. FIGS. 1-3 provide additional details of a system and method for an intelligent pet food dispenser.

FIG. 1 illustrates an example pet food dispenser 100 according to an embodiment of the present disclosure. Pet food dispenser 100 may include transport conveyor 110, chamber 113, track 114, graphical user interface (GUI) 115, blade 128, extractor 130, food tray 132, trash tray 134, motion sensor 141, and pet 143.

Pet food dispenser 100 may utilize a number of different methods to initiate the dispersal of pet food 133 into food tray 132. Using GUI 115, a user may program pet food dispenser 100 to dispense food at a predetermined time (e.g., 8:00 a.m.) and/or dispense food in response to pet 143 tripping motion sensor 141.

Motion sensor 141 represents any device operable to detect the presence of pet 143. Motion sensor 141 may be located anywhere on pet food dispenser 100. In certain embodiments, pet food dispenser 141 may include multiple motion sensors 141. For example, in the illustrated embodiment, motion sensor 141 is located near food tray 134. Motion sensor 141 may utilize one or more technologies to monitor the presence of pet 143 including optical, microwave, and/or acoustic sensors to determine whether pet 143 is present by pet food dispenser 100. In some embodiments, motion sensor 141 may incorporate multiple sensing technologies to improve the ability of motion sensor 141 to detect the presence of pet 143. For example, motion sensor 141 may include an infrared sensor to detect the temperature of pet 143 (to distinguish pet 143 from a toy or piece of debris) combined with a microwave sensor using radar to determine the location of pet 143. Upon detecting pet 143, motion sensor 141 may activate pet food dispenser 100.

In some embodiments, pet food dispenser 100 may be activated at certain, predetermined times as set by GUI 115. GUI 115 represents any suitable graphical arrangement of information presented to one or more users (e.g., pet owners, veterinarians, pet sitters). GUI 115 may provide a user with an efficient and user-friendly presentation of information. For example, GUI 115 may display information received from chamber 113, motion sensor 141, or a user device such as a mobile phone and/or tablet. GUI 115 may comprise a plurality of displays having interactive fields, pull-down lists, and buttons operated by users. In an example embodiment, a user may set GUI 115 to activate pet food dispenser 100 to dispense pet food 133 to pet 143 at a specific time of day.

Once pet food dispenser 100 is activated, chamber 113 may dispense pet food pouch 112. Chamber 113 represents any structure that is operable to store pet food pouches 112 and to dispense a pet food pouch 112 at a designated dispense time (e.g., a time determined by GUI 115 and/or in response to motion sensor 141). Chamber 113 may be comprised of any suitable material such as steel, aluminum, plastic, fiberglass, or a variation thereof. In the illustrated embodiment, chamber 113 is attached to the side of pet food dispenser 100, with an opening at the top of chamber 113 for dispensing pet food pouch 112. In some embodiments, chamber 113 may be affixed to a lateral side of pet food dispenser 100. Chamber 113 may also be a free standing structure. In some embodiments, chamber 113 may have a door that allows a user, such as a pet owner or veterinarian, to load chamber 113 with pet food pouches 112. As described in FIGS. 2A and 2B, chamber 113 may dispense pet food pouch 112 using a number of different mechanisms.

In some embodiments, pet food pouch 112 is dispensed onto a high-friction surface of transport conveyor 110. The high-friction surface may prevent pet food pouch 112 from slipping when transferred to transport conveyor 110 from chamber 113. The high-friction surface may also keep pet food pouch 112 stable on transport conveyor 110 as it moves along track 114 and interacts with blade 128 and extractor 130. High-friction surface may be any suitable material including rubber, sandpaper, synthetic fiber, Velcro® or any surface operable to maintain the position of pet food pouch 112 while transport conveyor 110 moves along track 114.

Once transport conveyor 110 receives pet food pouch 112, transport conveyor 110 may proceed along track 114. Transport conveyor 110 may move along track 114 in a number of ways. For example, in the illustrated embodiment, transport conveyor 110 includes a set of four wheels that travel along track 114. In some embodiments, transport conveyor 110 may include a motor to move the wheels in a forward and reverse direction along track 114. A processor may control motor according to a programmed output that moves transport conveyor 110 from its original position to blade 128, extractor 130, and back to chamber 113.

In some embodiments, the wheels of transport conveyor 110 may include a plurality of gears and cogs to engage track 114. Track 114 may also include a plurality of complimentary gears and cogs to receive the gears and cogs from transport conveyor 110. A motor on transport conveyor 110 may turn the gears on transport conveyor 110 to move transport conveyor 110 along track 114. In some embodiments, a motor may be located on pet food dispenser 100 to move the complimentary gears and cogs of track 114 to propel transport conveyor 110 back and forth along track 114.

In certain embodiments, track 114 may be a conveyor system that moves transport conveyor 110 along pet food dispenser 100. The conveyor system may include a surface operable to carry transport conveyor 110 and various pulleys operable to move transport conveyor 110 down track 114. In some embodiments, track 114 and the wheels of transport conveyor 110 may include electromagnets operable to move transport conveyor 110 along track 114. Accordingly, transport conveyor 110 may interact with track 114 to move back and forth along pet food dispenser 100.

After receiving pet food pouch 112 from chamber 113, transport conveyor 110 may travel in a forward direction to blade 128. Blade 128 represents a structure operable to cut open pet food pouch 112. When transport conveyor 110 reaches blade 128, transport conveyor 110 may engage a mechanical switch that discharges blade 128 from a resting position. In some embodiments, blade 128 is activated using an optical sensor engaged by transport conveyor 110. In other embodiments, blade 128 may be set to a timer that activates blade 128 after pet food pouch 112 is dispersed from chamber 113.

Once blade 128 is discharged, blade 128 may cut open pet food pouch 112 using any appropriate technique. For example, once activated, blade 128 may fall from above transport conveyer 110 in a guillotine-like technique to open pet food pouch 112. In certain embodiments, blade 128 may be drawn across pet food pouch 112 to saw or cut open pet food pouch 112. Once blade 128 opens pet food pouch 112, blade 128 may retract and reset to its original position. In some embodiments, blade 128 may have a plain, sharp edge. In other embodiments, blade 128 may have a serrated edge. For example, if blade 128 cuts pet food pouch 112 in a saw-like motion, the serrated edge would allow blade 128 to pierce pet food pouch 112 and maintain a grip while cutting.

After pet food pouch 112 is opened by blade 128, transport conveyor 110 may continue forward along track 114 to extractor 130. Extractor 130 may operate to remove pet food 133 from pet food pouch 112. For example, when transport conveyor 110 moves forward along track 114, the front end of transport conveyor 110 may move past extractor 130, tripping a switch to activate extractor 130. Once past extractor 130, transport conveyor 110 may stop and switch directions of travel. Extractor 130 may lower down onto the back end of transport conveyor 110. Transport conveyor 110 may continue moving in the reverse direction while extractor 130 remains lowered onto transport conveyor 110. In this manner, extractor 130 may squeeze pet food 133 from pet food pouch 112 as transport conveyor 110 moves by extractor 130.

In some embodiments, upon being activated, extractor 130 may be lowered by rotation in a windmill-like manner. As extractor 130 is rotating down toward transport conveyor 110, extractor 130 may begin to exert pressure on one end of pet food pouch 112. Extractor 130 may continue to rotate and exert pressure on pet food pouch 112 causing pet food 133 to extract from the open end of pet food pouch 112. After rotating, extractor 130 may return to its resting position as pet food 133 has been extracted into food tray 132.

Similar to blade 128, extractor 130 may be activated by any suitable mechanism. For example, in one embodiment, as transport conveyor 110 moves in the forward direction along track 114, transport conveyor 110 may engage a mechanical switch that begins the rotation of extractor 130. In some embodiments, extractor 130 is triggered by an optical sensor that activates extractor 130 upon sensing transport conveyor 110. In certain embodiments, extractor 130 may be activated by a timer based on when pet food pouch 112 is dispensed from chamber 113.

In the illustrated embodiment, extractor 130 includes an arm coupled to an extractor bar. Extractor 130 may be comprised of any suitable material including plastic, wood, metal, and/or foam. The extractor bar may be any suitable shape. For example, the extractor bar may be cylindrical and roll as it extracts pet food 133 from pet food pouch 112. In some embodiments, the extractor bar may be wedge shaped and press pet food 133 from pet food pouch 112. Extractor 130 may be affixed to the top of pet food dispenser 100 and/or affixed to the lateral side of pet food dispenser 100. In some embodiments, extractor 130 may be a freestanding structure positioned above pet food dispenser 100.

Extractor 130 may be capable of extracting a variety of pet food 133 types, including wet and dry pet food, into food tray 132. In some embodiments, extractor 130 may allow a user to use various shapes and attachments for the extractor bar to accommodate the type of pet food 133 being dispensed into food tray 132. For example, wet pet food 133 may be dispensed more efficiently using a rolling, cylindrical extractor bar, while dry food may be dispensed more efficiently using a wedge shaped dispenser bar. Accordingly, extractor 130 may be customizable to compliment the type of food 133 dispensed from chamber 113.

Food tray 132 represents any suitable structure operable to receive pet food 133. In certain embodiments, food tray 132 may be located below extractor 130. When pet food 133 is extracted by extractor 130, it may be pushed off transport conveyor 110 and into food tray 132. In some embodiments, pet food dispenser 100 may have an opening for pet 143 to reach food tray 132. In other embodiments, food tray 132 may be located outside of pet food dispenser 100 such that extractor 130 extracts pet food 133 out of pet food pouch 112 and over an edge of pet food dispenser 100.

Once pet food 133 has been extracted into food tray 132, transport conveyor 110 may continue traveling in the reverse direction along track 114. Transport conveyor 110 may then utilize trapdoor 142 to dispose of the empty pet food pouch 112 into trash tray 134. In certain embodiments, a first side of trapdoor 142 is operable to engage and disengage with transport conveyor 110 by an electromagnetic system 118. Electromagnetic system 118 may include one or more components. For example, a first electromagnet may be located on first side of trapdoor 142 and be operable to mate with second electromagnet on transport conveyor 110. The second side of trapdoor 122 may connect to transport conveyor 110 by a hinge. Accordingly, while the electromagnets are engaged, trapdoor 142 remains closed. When the electromagnets are disengaged, trapdoor 142 opens causing an empty pet food pouch 142 to fall below transport conveyor 110 into trash tray 134.

In certain embodiments, an electrical switch located on transport conveyor 110 is operable to release the electromagnetic system on trapdoor 142 and open trapdoor 142. The electrical switch may remove power from electromagnetic system 118 causing the first side of trapdoor 142 to fall below transport conveyor 110. When the electromagnetic system is released and trapdoor 142 is opened, empty pet food pouch 112 will be disposed of into trash tray 134.

Although illustrated using electromagnetic system 118, trap door 142 may operate using a mechanical switch including male and female connectors. For example, the mechanical switch may operate to release a male connector from a female connector causing trap door 142 to open, disposing empty pet food pouch 142 to fall into trash tray 134. As such, any suitable mating system may be utilized to operate trap door 142 and release empty pet food pouches 112 into trash tray 134.

Trash tray 134 represents a structure for receiving and storing empty pet food pouches 112 from transport conveyor 110. In certain embodiments, trash tray 134 may be located below the transport conveyor 110. In some embodiments, pet food dispenser 100 may have an opening that will allow the user to remove trash tray 134. The size of trash tray 134 may also vary depending on the expected amount and size of empty pet food pouches 112 discarded into trash tray 134. The use of trash tray 134 may prevent the user from having to manually dispose of each empty pet food pouch 112 after each cycle of pet food dispenser 100. This may be beneficial for the user if the user is away from pet food dispenser 100 for an extended period of time.

As transport conveyor 110 continues down track 114 in the reverse direction, it may engage with wall 140 to close trapdoor 140. As transport conveyor 110 moves over wall 140, trapdoor 142 may make contact with wall 140 and be pushed upward. As trapdoor 142 is being moved upward, the first electromagnet may re-engage with the second electromagnet. Once trapdoor 140 is closed, transport conveyor 110 may reset at its original position and wait for another pet food pouch 112 to dispense from chamber 113. In this manner, pet food dispenser 100 may provide pet food 133 to pet 143 using transport conveyor 110, blade 128, and extractor 130.

In addition to dispensing pet food 133, pet food dispenser 100 may include a number of systems and features to aid in providing prompt and sanitary pet food 133. For example, trash tray 134 may include a scale to weigh and detect the amount of waste in trash tray 134. By measuring the weight of trash tray 134, the scale may determine how many empty pet food pouches 112 have been disposed in trash tray 134. Upon reaching a predetermined weight (indicating a predetermined number of empty pet food pouches 112), the scale may communicate a signal to GUI 115 indicating that trash tray 134 has reached the predetermined weight. In some embodiments, upon reaching the predetermined weight, GUI 115 may activate trash alarm 145 to alert pet owners that trash tray 134 is full. Trash tray alarm 145 may be an audible speaker system or a visible flashing light. In other embodiments, the scale sends a signal to GUI 115 every time an empty pet food pouch 112 is received by trash tray 134. This feature may allow the user to track how often the pet is feeding as well as how much waste is in trash tray 134. A user may utilize GUI 115 to select the predetermined weight used by the scale to monitor the weight of trash tray 134.

Pet food dispenser 100 may also include a number of systems to increase the sanitation of pet food dispenser 100. For example, in the illustrated embodiment, pet food dispenser 100 includes anti-bacterial liquid dispensing device 136 and ultraviolet light 138.

Anti-bacterial liquid dispensing device 136 represents a structure operable to dispense anti-bacterial liquid 139 when the scale detects the presence of waste in trash tray 134. In certain embodiments, anti-bacterial liquid dispensing device 136 may be a pouch-like container with a nozzle that holds and dispenses anti-bacterial liquid 139. Alternatively, anti-bacterial liquid dispensing device 136 may be a spray bottle that holds and sprays or mists anti-bacterial liquid 139. Anti-bacterial liquid dispensing device 136 may be comprised of plastic, metal, glass, or any suitable material.

In certain embodiments, when the scale detects that a new, empty pet food pouch 112 has been added to trash tray 134, anti-bacterial liquid dispensing device 136 may dispense anti-bacterial liquid onto trash tray 134 and the empty pet food pouch 112. In some embodiments, anti-bacterial liquid dispensing device 136 may be activated after all waste has been removed. This feature may help keep trash tray 134 free of bacteria and pathogens and reduce the number of times that the user may have to clean trash tray 134. Anti-bacterial liquid dispensing device 136 may also eliminate the odor of waste in trash tray 134.

Pet food dispenser 100 may additionally or alternatively utilize ultraviolet light 138 to disinfect trash tray 134. In certain embodiments, when the scale detects waste in trash tray 134, ultraviolet light 138 is activated. The UV light emitted by ultraviolet light 138 may kill bacteria on trash tray 134. Ultraviolet light 138 may be affixed to pet food dispenser 100 at any suitable location, for example next to or above trash tray 134.

Pet food dispenser 100 may also utilize GUI 115 for controlling and customizing pet food dispenser 100. For example, GUI 115 may display the number of pet food pouches 112 currently remaining in chamber 113. This feature may inform the pet owner when chamber 113 needs to be refilled with pet food pouches 112. GUI 115 may also receive various user input commands to control the operation of pet food dispenser 100. For instance, GUI 115 may receive an input command from a user for setting a time at which pet food pouch 112 is dispensed. GUI 115 may also receive user commands for setting a waste threshold in trash tray 134 and a pet food pouch threshold in chamber 113.

In certain embodiments, GUI 115 may also communicate messages to a user. For example, GUI 115 may communicate a notification message to a user when pet food pouches 112 in chamber 113 are less than a pet food pouch threshold (e.g., 1, 3, and/or 5 pouches). GUI 115 may calculate the number of pet food pouches 112 remaining in chamber 113 by tracking the amount of times chamber 113 dispenses pet food pouch 112 compared to the amount of times a user inputs a pet food pouch 112 into chamber 113.

Pet food dispenser 100 may also include pet food pouch alarm 144. Pet food pouch alarm 144 may be operable to notify a user when the number of pet food pouches 112 in chamber 113 is less than a pet food pouch threshold. For example, if the number of pet food pouches 112 is fewer than three pouches, pet food pouch alarm 144 may be activated. Pet food pouch alarm 144 may be an audible speaker system or a visible flashing light. Pet food pouch alarm 144 may be attached anywhere on pet food dispenser 100 such as on the outside of chamber 113 or integrated with GUI 115.

In this manner, a pet owner may know when to purchase additional pet food pouches 112. GUI 115 may also communicate a notification message to the user when an amount of waste in trash tray 134 exceeds the waste threshold. This may allow the user to clean out trash tray 134 when a predetermined number of pet food pouches 112 have been utilized by pet food dispenser 100. GUI 115 may utilize any suitable type of notification message including an SMS message, an email, a facsimile, and a prerecorded telephone message. In addition to interacting with GUI 115 via pet food dispenser 100, a user may communicate with GUI 115 via a user device such as a cell phone or tablet device. The user may communicate commands to GUI 115 using an SMS message, an email, a facsimile, or an application on a mobile device. This may allow the user to communicate with GUI 115 even while physically away from pet food system 100.

In some embodiments, plurality of brushes 153 are attached to transport conveyor 110. Brushes 153 may remove residue from track 114 as transport conveyor 110 begins to move along track 114. Brushes 153 may be located under transport conveyor 110. Brushes 153 may be comprised of synthetic fibers or any other suitable material to clean and remove debris from track 114. The shape, size, or number of plurality of brushes 153 may vary. For example, larger brushes and/or several brushes may be desired to increase friction as transport conveyor 110 moves along track 114. One purpose of brushes 153 and the removal of residue on track 114 is to increase speed and accuracy of the movement of transport conveyor 110. Also, the removal of residue on track 114 may decrease the necessity for the user to clean track 114.

To keep track of the number of times transport conveyor 110 has delivered food, transport conveyor 110 may include an odometer. The odometer may measure the distance traveled by transport conveyor 110 along track 114 and/or the number of times transport conveyor 110 has completed a trip along track 114. In certain embodiments, the odometer may send the information about the distance travelled to GUI 115. This feature will allow the user to track how often pet food dispenser 100 is dispensing pet food to his or her pet.

Modifications, additions, or omissions may be made to system 100 without departing from the scope of the disclosure. For example, although the illustrated embodiment shows blade 128 before extractor device 130, in some embodiments, extractor device 130 may be before blade 128. For example, transport conveyor 110 may move pet food pouch 112 to the end of track 114 to blade 128. After opening pet food pouch 112 using blade 128, transport conveyor 110 may move in the reverse direction to extractor 130 to have pet food 133 removed from pet food pouch 112.

As another example, pet food dispenser 100 may utilize additional methods to activate chamber 113. For example, pet food dispenser 100 may include a microphone that may detect a "meow" or "bark" from pet 143. In response, chamber 113 may dispense pet food pouch 112 to transport conveyor 110. In this manner, a user may train a pet to activate pet food dispenser 100 when the pet is hungry. Any suitable logic may perform the functions of system 100 and the components within system 100.

FIGS. 2A and 2B disclose example embodiments of dispensing mechanisms utilized by chamber 113. FIG. 2A is a diagram of an example spiral dispensing mechanism 200A of a pet food chamber 113 according to an embodiment of the present disclosure. In the illustrated embodiment, chamber 113 utilizes a spiral dispensing mechanism to deliver pet food pouches 112 to transport conveyor 110 at a predetermined time. Spiral dispensing mechanism 200A includes motor 210, spiral coils 212, laser sensor 214, and barcode scanner 216.

Upon determining that pet food pouch 112 should be dispensed to transport conveyor 110, spiral dispensing mechanism 200A may initiate motor 210 to turn spiral coils 212 one full rotation to dispense pet food pouch 112 from chamber 113 to transport conveyor 110. For example, a pet owner may train pet 143 to approach pet food dispenser 100 and sit in front of motion detector 141 when pet 143 is hungry. Motion sensor 141 may detect the presence of pet 143 and activate chamber 113 if pet 143 sits in front of motion sensor 141 for a set period of time (e.g., thirty seconds). In response to detecting pet 143, motion sensor 141 may send an activation signal to chamber 113. Upon receiving the activation signal, chamber 113 may activate motor 110 to turn spiral coils 212 one full rotation to eject pet food pouch 112 onto transport conveyor 110. As described in FIG. 1, transport conveyor 110 may then proceed along track 114 to blade 128 and extractor device 130 to deliver pet food 133 to food tray 132.

Chamber 113 may also include laser sensor 214. Laser sensor 214 may detect the number of pet food pouches 112 in chamber 113 and/or whether chamber 113 is out of pet food pouches 112. For instance, laser sensor may utilize an infrared sensor to detect whether any pet food pouches 112 remain in chamber 113. In some embodiments, laser sensor 214 may measure the vacant space left in chamber 113 after each pet food pouch 112 is dispensed to determine how many pet food pouches 112 remain. In some embodiments, if laser sensor 214 detects that the number of pet food pouches 112 are less than the pet food pouch threshold, chamber 113 may activate pet food pouch alarm 144.

Chamber 113 may also include barcode scanner 216. Barcode scanner 216 may scan barcode 146 on pet food pouch 112. Barcode 146 on pet food pouch 112 may include a set of information such as the type of pet food, brand of food, nutritional value, caloric value and other dietary information. In some embodiments, the barcode information may include medicinal information such as a type of medicine or dosage included in pet food pouch 112.

Barcode scanner 216 may be located at any suitable location on pet food dispenser 100. In the illustrated embodiment, barcode scanner 216 is positioned near the top of spiral coils 212. Thus, in some embodiments, barcode scanner 216 may be activated when motor 210 turns spiral coils 212 to release pet food pouch 112. Barcode scanner 216 may scan barcode 146 and identify the pet food information describing pet food 133. In certain embodiments, barcode scanner 216 may send the pet food information to GUI 115. GUI 115 may display the nutritional information sent from barcode scanner 216 and/or transmit the pet food information to a user. In this manner, the user may track the nutritional or medicinal intake of pet 143.

By monitoring the food intake of pet 143, the user may be able to observe the dietary preferences and eating habits of pet 143. For instance, the user may determine what types or brands of pet food 133 pet 143 likes and dislikes; the caloric intake of pet 143 over the course of a day, week, and/or month; the dosage of medicine that pet 143 has consumed over a specific time period; or any other habit that a user may wish to monitor.

A number of other mechanisms may be utilized by chamber 113 to dispense pet food pouches 112 onto transport conveyor 110. For example, FIG. 2B is a diagram of an example carousel dispensing mechanism 200B of a pet food chamber 113 according to an embodiment of the present disclosure. Carousel dispensing mechanism 200B may include spokes 224 rotated by rod 224. Pet food pouches 112 may rest on one or more of spokes 224.

Upon determining that pet food pouch 112 should be dispensed, carousel dispensing mechanism 200B may initiate a motor (not pictured) to rotate rod 222 to spin spokes 224 to release pet food pouch 112 from chamber 113 and onto transport conveyor 110. For example, a user may wish to feed pet 143 at 8:00 a.m. GUI 115 may include an internal clock that monitors the time. At 8:00 a.m., GUI 115 may send an activation signal to chamber 113 to dispense pet food pouch 112. A motor may then turn rod 222 such that spokes 224 turn and dispense pet food pouch 112 onto transport conveyor 110. Transport conveyor 110 may then proceed along track 114 to blade 128 and extractor device 130 to deliver pet food 133 to food tray 132.

Similar to FIG. 2A, carousel dispensing mechanism 200B may include barcode scanner 216 and/or laser sensor 214. For example, in the illustrated embodiment, barcode scanner 216 is positioned near the output of chamber 113 near carousel dispensing mechanism 200B. As carousel dispensing mechanism 200B rotates, barcode scanner 216 may scan barcode 146 on pet food pouch 112 to determine information related to pet food 133.

Modifications, additions, or omissions may be made to spiral dispensing mechanism 200A and/or carousel dispensing mechanism 200B without departing from the scope of the disclosure. For example, although the illustrated embodiment shows a series of spiral coils 212, in some embodiments spiral coils 212 may be replaced with platforms for pet food pouches 112 to sit on. Motor 210 may move the platforms up chamber 113 and, upon reaching the top of chamber 113, the platform may tip pet food pouch 112 out of chamber 113 onto transport conveyor 110.

FIG. 3 is a flowchart of an example method 300 for dispensing pet food 133 using an intelligent pet food dispenser. At step 310, pet food dispenser 100 determines whether pet 143 has activated motion sensor 141. For example, in some embodiments, pet 143 may activate pet food dispenser 100 upon sitting in front of motion sensor 141 for a predetermined period of time (e.g., 30 seconds, 1 minute, 90 seconds). In some embodiments, pet food dispenser 100 is set on a timer and dispenses pet food 133 at set times (e.g., 8:00 a.m., 6:00 p.m.). If at step 310, pet food dispenser 100 has been activated, the sequence proceeds to step 320. If, however, pet food dispenser 100 has not been activated, the sequence may continue to hold until activated.

At step 320, chamber 113 dispenses pet food pouch 112 to transport conveyor 110. In some embodiments, transport conveyor 110 may include a high-friction surface to prevent pet food pouch 112 from slipping or moving off transport conveyor 110 while transport conveyor 110 moves along track 114. As explained in FIGS. 1, 2A, and 2B, chamber 113 may use any suitable mechanism to store and dispense pet food pouches 112.

At step 330, once transport conveyor 110 receives pet food pouch 112, transport conveyor 110 may transport pet food pouch 112 down track 114 to an opening mechanism, such as blade 128. For example, transport conveyor 110 may comprise a number of gears and cogs that engage gears and cogs and track 114. Transport conveyor 110 and/or track 114 may rotate the gears and cogs to propel transport conveyor 110 down track 114.

At step 340, an opening device opens an end of pet food pouch 112. For example, opening device may be blade 128. Upon reaching blade 128, blade 128 may come down on top of pet food pouch 112 and open an end of pet food pouch 112. In certain embodiments, pet food pouch 112 may utilize a sawing motion to slice open pet food pouch 112.

At step 350, transport conveyor 110 may move the opened pet food pouch 112 down track 114. In some embodiments, upon reaching the end of track 114, transport conveyor 110 may reverse direction and move back along track 114 to extractor 130. At step 360, extractor 130 may engage the opened pet food pouch 112 and extract pet food 133 by squeezing pet food 133 from pet food pouch 112.

After dispensing pet food 133 into food tray 132, transport conveyor 110 may continue in the reverse direction to its original position. While moving to the original position, at step 370, trap door 142 may be engaged to dispose the empty pet food pouch 112 into trash tray 134. Trap door 142 may be engaged using any suitable means. For instance, trap door 142 may include electromagnet system 118 used to open and close trap door 142. After reaching a disposal area of track 114, electromagnet system 118 may trigger, opening a first side of trap door 142 and releasing the empty pet food pouch 112 into trash tray 134 below transport conveyor 110. In some embodiments, trap door 142 may be put back into place by moving over wall 140, which props the released portion of trap door 142 back into place and re-engaging electromagnet system 118.

In some embodiments, trapdoor 142 may be a mechanical system with a male-female latch. The mechanical system may be triggered upon reaching a disposal area on track 114. A first side of trapdoor 142 may swing open dropping pet food pouch 112 into trash tray 134. Wall 140 may be used to prop the released portion of trap door 142 back into place and re-engage the male-female mechanical components. After resetting trapdoor 142, transport conveyor 110 may return to its original position and wait for chamber 113 to dispense a new pet food pouch 112. In this manner, method 300 provides pet food 133 to pet 143.

Various embodiments may perform some, all, or none of the steps described above. For example, in certain embodiments, transport conveyor 110 may be propelled down track 114 using wheels and a motor. The motor may be programed to move transport conveyor 110 to blade 128 and extractor 130. Furthermore, certain embodiments may perform these steps in a different order, in parallel, or omit certain steps. For example, in some embodiments, blade 128 may be internal to chamber 113 instead of on track 114. Moreover, one or more steps may be repeated. Any suitable component of pet food dispenser 100 may perform one or more steps of method 300.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A system for dispensing pet food, comprising:
a chamber operable to store a plurality of pet food pouches and dispense one of the plurality of pet food pouches at a dispense time;
a transport conveyor operable to receive, from the chamber, a pet food pouch, the transport conveyor further operable to:
transport the pet food pouch along a track;
activate a blade to cut open the pet food pouch;
transport the opened pet food pouch along the track to an extractor;
activate the extractor to lower a cylindrical extracting bar onto the transport conveyor;
extract pet food from the pet food pouch using the extractor bar into a food tray below the track, wherein the extractor bar is cylindrical and engages the pet food pouch along the long axis of the cylinder and is free to roll along the long axis of the cylinder as the extractor bar extracts pet food from the pet food pouch as said transport conveyor travels relative to said extractor bar; and
dispose the pet food pouch into a trash tray below the track by releasing a trapdoor in the transport conveyor.

2. The system of claim 1, wherein the chamber comprises:
a spiral dispenser operable to move one of the plurality of pet food pouches from the chamber to the transport conveyor;
a laser sensor operable to detect a number of pet food pouches in the chamber; and
a pet food pouch alarm operable to notify a user when the number of pet food pouches in the chamber is less than a pet food pouch threshold.

3. The system of claim 1, wherein the trash tray further comprises:
a scale operable to detect an amount of waste in the trash tray;
a trash tray alarm operable to notify a user when the amount of waste in the trash tray exceeds a waste threshold;
an ultraviolet light operable to disinfect the trash tray, wherein the ultraviolet light operates when the scale detects a presence of waste in the trash tray; and
an anti-bacterial liquid dispensing device operable to spray the trash tray with an anti-bacterial liquid when the scale detects the presence of waste in the trash tray.

4. The system of claim 1, further comprising a graphical user interface (GUI) operable to:
display a number of pet food pouches in the chamber;
receive a first user input command for setting a time at which pet food is dispensed; and
receive a second user input command for setting a waste threshold and a pet food pouch threshold.

5. The system of claim 1, further comprising:
a motion sensor operable to detect a presence of a pet; and
the chamber is further operable to dispense a pet food pouch to the transport conveyor when the presence of the pet is detected.

6. The transport conveyor of claim 1, wherein:
a first side of the trapdoor is operable to engage to the transport conveyor by a first electromagnet;
the first electromagnet is operable to mate with the transport conveyor; and
a second side of the trapdoor connects to the transport conveyor.

7. The system of claim 1, wherein the chamber further comprises:
a bar code scanner operable to scan a barcode on each of the plurality of pet food pouches, the barcode comprising a set of information describing a caloric value of pet food and a type of pet food in the one of the plurality of pet food pouches.

8. A method for dispensing pet food, the method comprising:
receiving, at a transport conveyor, a pet food pouch from a chamber;
transporting the pet food pouch along a track using the transport conveyor;

activating a blade to cut open the pet food pouch using the transport conveyor;

transporting the opened pet food pouch along the track to an extractor using the transport conveyor;

activating the extractor to lower a cylindrical extracting bar onto the transport conveyor;

extracting pet food from the pet food pouch into a food tray below the track using the extractor bar, wherein the extractor bar is cylindrical and engages the pet food pouch along the long axis of the cylinder and is free to roll along the long axis of the cylinder as the extractor bar extracts pet food from the pet food pouch as said transport conveyor travels relative to said extractor bar; and disposing the pet food pouch into a trash tray below the track by releasing a trapdoor in the transport conveyor.

9. The method of claim 8, wherein the chamber further comprises a laser sensor and a pet food pouch alarm, the method further comprising:

detecting, with the laser sensor, a number of pet food pouches in the chamber; and notifying, with a pet food pouch alarm, a user when the number of pet food pouches in the chamber is less than a pet food pouch threshold.

10. The method of claim 8, further comprising:

weighing, with a scale, an amount of waste in the trash tray;

notifying, with a trash tray alarm, a user when the amount of waste in the trash tray exceeds a waste threshold;

disinfecting, with an ultraviolet light, the trash tray when the scale detects a presence of waste in the trash tray; and dispensing an anti-bacterial liquid, with an anti-bacterial liquid dispensing device, to clean the trash tray when the scale detects the presence of waste in the trash tray.

11. The method of claim 8, further comprising:

displaying, using a graphical user interface (GUI), a number of pet food pouches in the chamber;

receiving, using the GUI, a first user input command for setting a time at which pet food is dispensed; and receiving, using the GUI, a second user input command for setting a waste threshold and a pet food pouch threshold.

12. The method of claim 8, further comprising:

detecting, with a motion sensor, a presence of a pet; and dispensing a pet food pouch from the chamber to the transport conveyor when the presence of the pet is detected by the motion sensor.

13. The method of claim 8, wherein the chamber further comprises a barcode scanner and a graphical user interface (GUI), the method further comprising:

scanning, with the barcode scanner, a barcode on the pet food pouch to receive a set of information, the set of information comprising a caloric value of pet food in the pet food pouch and a type of pet food in the pet food pouch; and displaying the set of information on the graphical user interface (GUI).

14. The method of claim 8, wherein the transport conveyer further comprises a brush, the method further comprising removing debris from the track using the brush.

* * * * *